US006302596B1

(12) United States Patent
Cohen et al.

(10) Patent No.: US 6,302,596 B1
(45) Date of Patent: Oct. 16, 2001

(54) SMALL FORM FACTOR OPTOELECTRONIC TRANSCEIVERS

(75) Inventors: Mitchell S. Cohen, Millwood, NY (US); David P. Gaio, Rochester, MN (US); William K. Hogan, Rochester, MN (US); Phillip D. Isaacs, Rochester, MN (US); Patrick E. McKnite, Rochester, MN (US); Miles Swain, Hayfield, MN (US); Jeannine M. Trewhella, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/348,955

(22) Filed: Jul. 7, 1999

(51) Int. Cl.$^7$ ...................................................... G02B 6/36
(52) U.S. Cl. ............................... 385/93; 385/88; 385/89; 385/92
(58) Field of Search ................................. 385/93, 92, 88, 385/89, 90

(56) References Cited

U.S. PATENT DOCUMENTS

| 5,504,828 | 4/1996 | Cina et al. . | |
|---|---|---|---|
| 5,511,140 | 4/1996 | Cina et al. . | |
| 5,537,504 | 7/1996 | Cina et al. . | |
| 5,596,665 | * 1/1997 | Kurashima et al. | 385/92 |
| 5,631,991 | 5/1997 | Cohen et al. . | |
| 5,692,083 | * 11/1997 | Bennett | 385/88 |
| 5,708,743 | * 1/1998 | DeAnres et al. | 385/88 |
| 5,751,878 | * 5/1998 | Kyoya | 385/93 |
| 5,778,127 | * 7/1998 | Gilliland et al. | 385/92 |
| 6,059,461 | * 5/2000 | Aoki et al. | 385/60 |

OTHER PUBLICATIONS

Cohen et al., "Low–Cost Fabrication of Optical Subassemblies," IEEE, Electronic Components and Technology Conference, 1996, pp. 1093–1100.
Shahid et al, "Small and Efficient Connector Systems," IEEE, Electronic Components and Technology Conference, 1999, pp. 375–380.
Carson Schwantes, "Small–form factors herald the next generation of optical connectors," Lightwave, Oct. 1998, pp. 65–67.

* cited by examiner

Primary Examiner—Rodney Bovernick
Assistant Examiner—Sung Pak
(74) Attorney, Agent, or Firm—F. Chau & Associates, LLP

(57) ABSTRACT

An optical subassembly (OSA), in accordance with the present invention, includes a housing, which may be substantially rectangular, the OSA includes a first end portion and a second end portion oppositely disposed from the first end portion. The first end portion forms a bore configured and dimensioned to receive a ferrule having an optical fiber therein. The bore is adjacent to a ferrule stop which is integrally formed in the housing. A lens is integrally formed with the housing. The lens has a planar surface and a convex surface opposite the planar surface. The planar surface of the lens is substantially parallel to and set in from the ferrule stop to prevent contact between the ferrule and the planar surface. The optical device, the lens, and the bore which accepts the ferrule are all in optical alignment.

29 Claims, 8 Drawing Sheets

SMALL FORM FACTOR OPTOELECTRONIC TRANSCEIVERS

BACKGROUND OF THE INVENTION

1. Field of the Invention

The present invention relates to optoelectronic transceivers, and more particularly to a optoelectronic transceivers fabricated to be reduced in size and manufacturing complexity.

2. Description of the Related Art

Conventional duplex fiber optic connectors, such as SC Duplex connectors, (see, for example, ANSI Fibre Channel—physical and signaling interface (FC-PH) X3.230 rev. 4.3 (1994)) achieve the required alignment tolerances by threading each optical fiber through a precision ceramic ferrule. The two ferrules of an SC connector have an outer diameter of 2.5 mm, and the resulting fiber-to-fiber spacing (or pitch) of a duplex connector is approximately 12.5 mm, i.e., the distance from ferrule face to ferrule face when in operative position in the connector. Since the outer of the fiber captured by the ferrule is only 125 μm, it should be possible to design a significantly smaller optical connector. Smaller connectors with fewer precision parts could dramatically reduce manufacturing costs.

Recently, a new class of "small form factor" (SFF) fiber optic connectors has been introduced with the goal of reducing the size of a fiber optic connector to one half of that of a standard SC Duplex connector while maintaining or reducing the cost. Such connectors are described by C. Schwantes, in "Small form factors herald the next generation of optical connectors", Lightwave, October 1998, pp. 65–68. Several different designs have been proposed by different manufacturers, including the LC (manufactured by Lucent Technologies and others), MT-RJ (manufactured by Fujikura, Siecor and AMP and others), and VF-45 (manufactured by 3M Corp.). All connectors use the familiar RJ45 modular jack latching mechanism used in telephone cords for securing the connector.

While the smaller size of the SFF connectors is in itself an important advantage, an equally important advantage of the new SFF technology lies in the corresponding smaller size of the transceivers which mate to these connectors. The transceiver is a module including a digitally modulated laser to feed light signals into the outgoing fiber of the mating SFF connector, as well as a detector which receives light signals from the incoming fiber of that detector. The transceiver also includes the electronic chips which process these signals for both the transmitting and receiving functions, and provide connections between the module and a "master" board to which it is connected.

The smaller SFF transceiver size means that less area on the board is occupied, which permits the user to install more interconnects. A SFF Multisourcing Agreement between major manufactures of optical transceivers specifies a 13.97 mm pitch requirement between ferrules for the transceivers, a maximum length requirement for the transceivers of 31 mm, and a maximum height of 9.8 mm, which in effect permits a doubling of the port density compared with transceivers designed to mate to SC Duplex connectors.

Careful attention is needed to design a SFF transceiver to ensure full functionality while maintaining a low cost. A critical component of the transceiver is the optical subassembly (OSA) which carries out the conversion of electrical to optical signals (transmitter optical subassembly, TOSA), or optical to electrical signals (receiver optical subassembly, ROSA). The optoelectronic chips, i.e. laser (transmitter) and detector (receiver) are usually housed in metal "TO" cans furnished with a window for light transmission, so that the chips are hermetically sealed. The fabrication of an optical system which serves to align the fibers to the chips in the cans while efficiently permitting optical power transfer represents a difficult challenge in the design of all OSAs.

Therefore, a need exists for OSAs which are smaller in size and easier to manufacture. In particular, a need exists for OSAs which mate to connectors with a small, 1.25 mm diameter ferrule, e.g. the LC connector.

SUMMARY OF THE INVENTION

An optical subassembly (OSA), in accordance with the present invention, includes a housing, which may be substantially rectangular, the OSA includes a first end portion and a second end portion oppositely disposed from the first end portion. The first end portion forms a bore configured and dimensioned to receive a ferrule having an optical fiber therein. The bore is adjacent to a ferrule stop which is integrally formed in the housing. A lens is integrally formed with the housing. The lens has a planar surface and a convex surface opposite the planar surface. The planar surface of the lens is substantially parallel to and set in from the ferrule stop to prevent contact between the ferrule and the planar surface. The optical device, the lens, and the bore which accepts the ferrule are all in optical alignment.

In alternate embodiments, the optical subassembly may include an optical transmitter (which is preferably class 1 eye safe) or an optical receiver. The housing preferably includes a material transparent to wavelengths of light provided by the optical transmitter so that the housing, the lens, and the bore and cavity at opposite ends of the housing comprise one monolithic component. The optical transmitter may be a light-emitting diode chip or preferably a laser transmitter chip, and the laser of the transmitter is a vertical cavity surface emitting laser chip or an edge emitting laser chip. The optical receiver is preferably a photodiode chip or a photodiode plus pre-amplifier combination chip. The housing may include a transparent plastic material which may include polycarbonate, polyethersulfone or polyetherimide. The optical device may be bonded to the housing with an ultraviolet light curing compound. The optical device may include either a transmitter or photodiode packaged in a suitable TO can. The optical subassembly is preferably adapted for LC connectors. The ferrule stop may include a recess for receiving debris introduced into the bore. The housing may include a protrusion extending from the second end portion forming a substantially circular opening in the housing for receiving the optical device. The protrusion may include an angled external surface about the circular opening to receive a bonding compound for bonding the optical device to the housing.

A transceiver module, in accordance with the present invention includes a compliant retainer having a first end portion oppositely disposed to a second end portion. The first end portion is dimensioned and configured to receive optical connectors. A circuit board is received in the second end portion of the retainer. The circuit board connects electrically to a master circuit board, so that the master board can communicate via the optoelectronic transceiver, e.g., to another master board. The transceiver circuit board processes signals to and from the optical subassemblies. The second end portion of the retainer also includes a U shaped portion for permitting optical subassemblies to be received in the retainer. The transceiver includes a transmitter optical subassembly matable to a receiver optical subassembly. Each of the transmitter and the receiver subassemblies includes a substantially rectangular housing forming a bore configured and dimensioned to receive a ferrule having an optical fiber therein. The bore is adjacent to a ferrule stop integrally formed in the housing. A lens is integrally formed with the housing. The lens has a planar surface and a convex surface opposite the planar surface. The planar surface of the lens is substantially parallel to and set in from the ferrule stop to prevent contact between the ferrule and the planar surface.

In alternate embodiments, the ferrule stop may include a recess for receiving debris introduced into the bore. The transceiver module may further include an optical device for each of the transmitter and the receiver subassemblies in operative relationship with the bore and the lens which are optically aligned with the fiber in the ferrule. The transmitter and receiver subassemblies may be matable by an attachment mechanism integrally formed in the housing of the transmitter subassembly and the receiver subassembly. The transmitter subassembly is preferably class 1 eye safe. The housings of the transmitter subassembly and the receiver subassembly preferably include a material transparent to wavelengths of light provided by the transmitter subassembly. The transmitter subassembly may include a laser and the laser of the transmitter subassembly is one of a vertical cavity surface emitting laser and an edge emitting laser. The housings of the transmitter subassembly and the receiver subassembly may include one of polycarbonate, polyethersulfone and polyetherimide.

The housing may be of substantially rectangular cross-section and receive an optical device. The optical device may be packaged in a TO can. The transceiver subassembly may be adapted for LC connectors. The housing may include a protrusion extending from the second end portion forming a substantially circular opening in the housing for receiving the optical device. The protrusion may include an angled external surface about the circular opening to receive a bonding compound for bonding the optical device to the housing.

A transceiver of the present invention includes a transmitter optical subassembly housing matable to a receiver optical subassembly housing. Each of the transmitter optical subassembly and the receiver optical subassembly includes an attachment structure for receiving the attachment structure of the other, the attachment structures being integrally formed into the housings.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention provides improved optical subassemblies (OSAs) which include an innovative OSA design for SFF transceivers. The present invention will be described in terms of an LC connector but is not limited to the LC connector. The LC connector is similar in principle to the SC Duplex connector, but incorporates "LC" ferrules of only 1.25 mm diameter (similar to MU ferrules) so that their diameter can be halved compared to the SC Duplex connector, as described in "Small and Efficient Connector System", by M. A. Shahid, Proc. 49th ECTC, 1999. The two ferrules are 6.25 mm (pitch) apart on center.

The present invention may be more easily understood by first presenting an SC Duplex transceiver. Plastic molding for low cost in SC connectors is described in U.S. Pat. No. 5,511,140 to M. F. Cina et al, U.S. Pat. No. 5,537,504 to M. F. Cina et al. and U.S. Pat. No. 5,631,991 to M. S. Cohen et al, all incorporated herein by reference. Also see M. S. Cohen et al., "Low-Cost Fabrication of Optical Subassemblies", Proc. 46th ECTC, pp. 1093–1100, 1996, also incorporated herein by reference. The design of OSAs which is illustratively described herein for the LC SFF connector involves a housing for the OSA which is molded using, for example, unfilled plastic. The housing of a prior art SC duplex connector includes several important features which will now be described.

Figure 1:
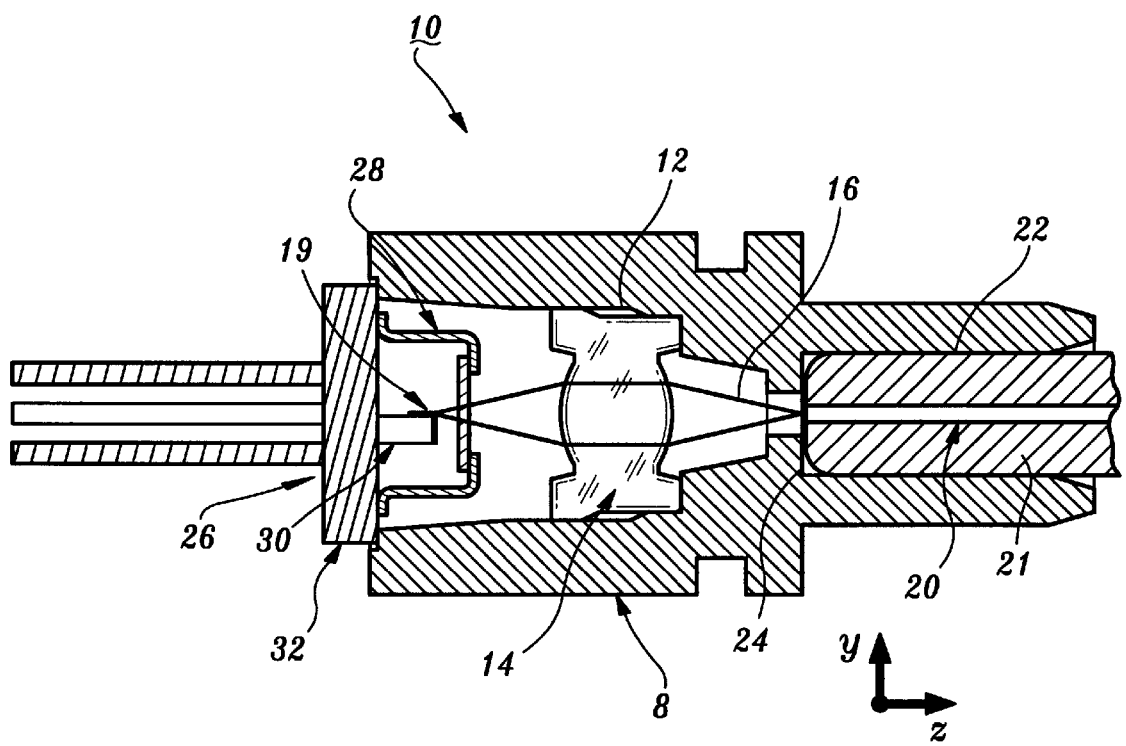
FIG. 1 is a cross-sectional view of a TOSA designed for use with an SC connector in accordance with the prior art.

Referring now to the drawings in which like numerals represent the same or similar elements and initially to FIG. 1, a conventional SC duplex TOSA (Transmitter Optical SubAssembly) 10 is shown. TOSA 10 includes a receptacle 12 for a lens 14 which focuses light 16 originating in a laser chip 19 on a fiber 20 (for the transmitter), or alternatively, a receptacle for a lens which focuses light originating in a fiber on a detector chip (for the receiver, not shown). A bore 22 having an inner diameter with a tightly held tolerance which receives a standard 2.5 mm ferrule is included. Upon insertion of the SC Duplex connector, an end of a fiber-threaded ferrule 21 rests on the end face 24 of bore 22, which acts as a ferrule stop. Ferrule 21 of the SC Duplex connector fits into ferrule bore 22. Lens 14 is a specially designed, injection-molded aspheric lens which fits into lens receptacle 12 of a housing 8 and fixed in place. Housing 8 is fabricated so that the axis of the ferrule bore is collinear with the axis of lens receptacle 12. Housing 8 and lens 14 are preferably plastic.

A laser TO can package 26 is shown which includes a TO can cap 28, a TO can pedestal 30 and a TO can deck 32. Here TO56 cans were commonly used because their relatively tight dimensional tolerances made it easier to align the optoelectronic chip to the rest of the OSA. The ROSA Receiver Optical SubAssembly) design for SC duplex connectors is similar to TOSA 10.

Special care is taken to align the optoelectronic chip 19 (which is mounted in the TO can 26), lens 14, and the fiber 20 in its ferrule 21 so that optical power is efficiently transferred. For that purpose, the TO can 26 is moved in the X, Y plane perpendicular to the optical axis as "active" alignment is carried out, i.e, the fiber axis is aligned, while the light is propagated through the fiber 20. When the optimum position corresponding to maximum power transfer has been achieved, radio frequency (RF) power is applied to the system so that the TO can rapidly heats up, thereby curing an epoxy layer which had previously been applied to the surface of the housing 8 interfacing the TO can 26. The aligning and fixing operations are typically carried out under computer control. A second epoxy layer can be subsequently applied and cured in an oven for an even more secure bond.

For the SC duplex design, no Z alignment (along the optical axis) is carried out, but only an X, Y alignment in the plane perpendicular to the optical axis. The Z alignment can be omitted because the placement of the optoelectronic chip 19 in the TO can 26, the dimensions of the TO can 26 itself, and the dimensions of the lens 14 and housing 8 are accurate enough to permit this omission. Furthermore, the lens 14 is specially designed to give a wide tolerance in Z placement, as well as wide tolerances in X and Y positions.

The present invention will now be illustratively described for SFF LC connector OSAs. While the same general approach for the SFF LC OSA fabrication and assembly procedures may be used as was employed for. the SC Duplex OSA case described above, the SFF LC presents severe constraints. Some of these severe constraints include:

1. The physical space available for the OSAs is significantly decreased.
2. The previously used TO56 cans are larger and more expensive than TO46 cans and therefore more difficult to fit into SFF applications. Some OE devices are commonly packaged in TO46 cans so the OSA had to accommodate the TO46 package. Offsetting the size and cost advantages of the TO46 cans is that they have much wider dimensional tolerances, which makes the alignment of the optoelectronic chip to the fiber through the lens more difficult, particularly in the Z (axial direction).
3. Cost in components and assembly must be kept low.
4. The TOSA must be class 1 eye safe at operating laser power.

The combined ROSA and TOSA had to be placed side by side in a space on the module carrier only 13.1 mm wide. This constraint was necessary to accommodate the receptacle (or retainer) for the OSAs, which could be no wider than the 13.97 mm absolute transceiver-width limit). Instead of the TO cans previously used (TO56), lasers and detector chips packaged in TO46 cans are preferably used for the present invention. The optoelectronic (OE) devices are placed in the TO46 cans with considerably wider tolerances in X, Y, and Z than the TO56 cans.

Edge-emitting lasers were used in the SC Duplex OSA case, while vertical-cavity surface-emitting lasers (VCSELs) are used in the SFF LC case. However, in accordance with the present invention either VCSELs or edge-emitting lasers may be used for the SFF LC application.

Figure 2:
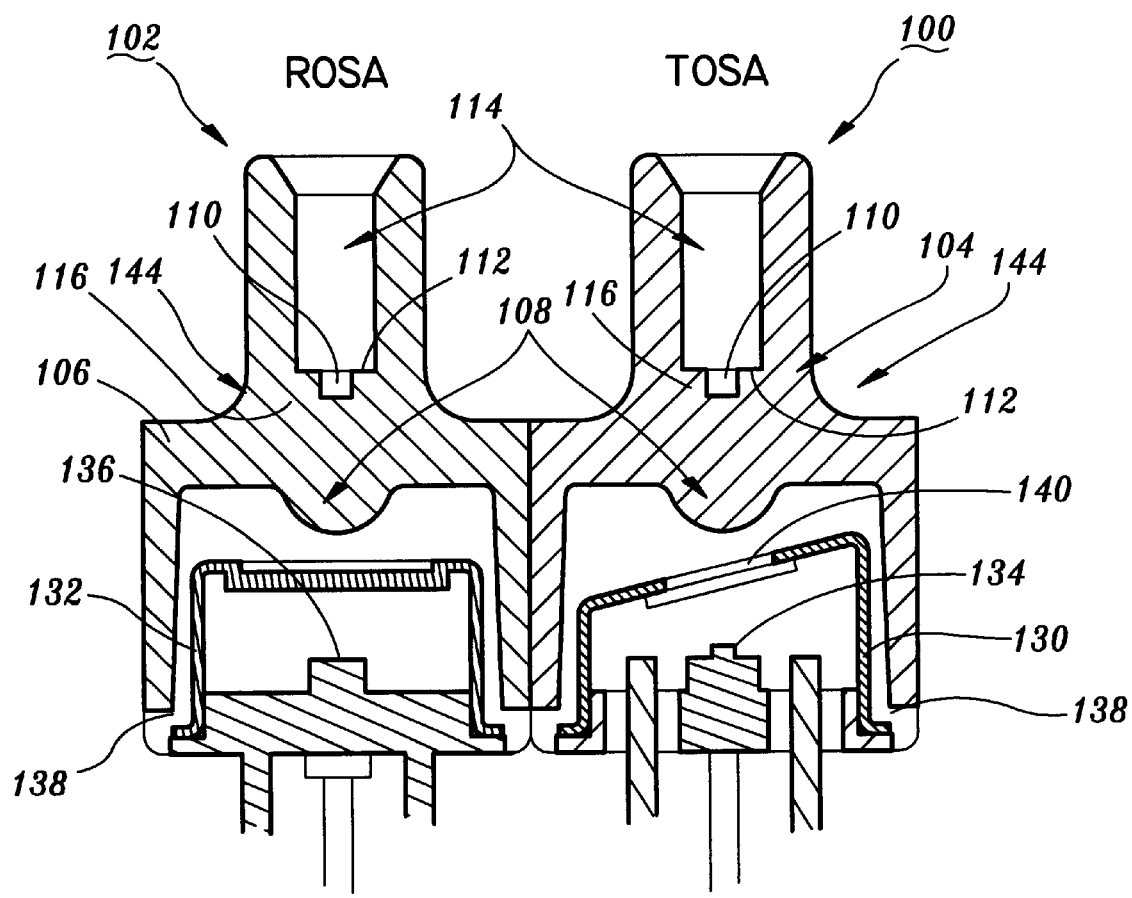
FIG. 2 is a cross-sectional view of an optical subassembly pair showing integrally formed lenses and dirt catchers in accordance with the present invention.
Figure 3A:
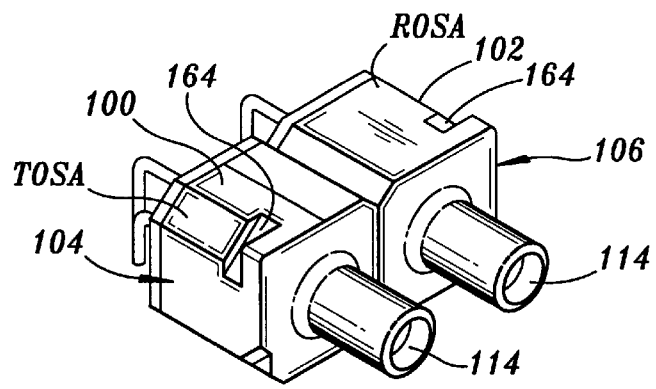
FIGS. 3A–B are perspective views of the optical subassemblies of FIG. 2 in accordance with the present invention.
Figure 3B:
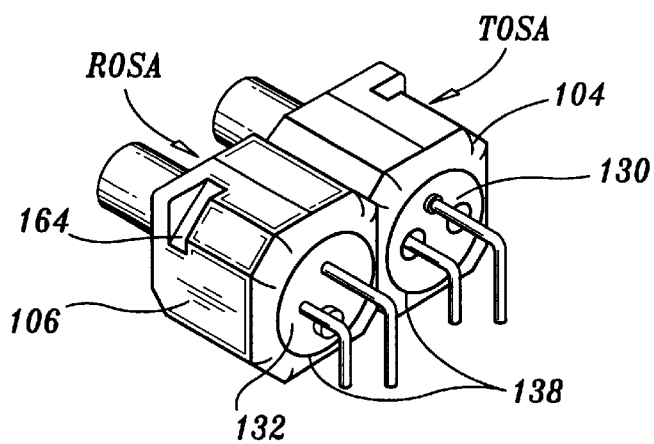

Referring to FIGS. 2 and 3A–B, a TOSA 100 and ROSA 102 are shown in two and three dimensions in accordance with the present invention. A TOSA housing 104 and a ROSA housing 106 each employ an integrally formed lens 108 therein. This "unibody" design is realized by fabrication with a transparent thermoplastic material, i.e, transparent to light emitted from a laser (i.e., the laser of the transmitter). The thermoplastic material may include one or more of polycarbonate, polyethersulfone, polyetherimide or other transparent thermoplastic materials. In a preferred embodiment, polyetherimide (Ultem™ 1000 or Ultem™ 1100, available commercially from General Electric Co.) is employed due to its high elasticity modulus and good stability at elevated temperatures. Lens 108 is advantageously formed with housings 104 and 106 such that no assembly and alignment process is needed there between.

In the present invention, a plano-convex lens is employed having a planar side 116 of the lens parallel and set in from the ferrule stop 112. Putting all of the optical power on only one side of the lens makes designing lens 108 more difficult, but surprisingly, a highly effective, easily manufacturable aspheric lens could be fabricated in this way. One advantage of such a lens is that no critical alignment of the molding pins used in a mold to form housings 104 and 106 is required to ensure coaxiality of both sides of the lens since one side has no optical power. Perpendicularity of the bore 114 and the planar side of the lens is important but easily achieved by using a single pin to mold the bore and lens flat. The resulting simple unibody design is relatively inexpensive to manufacture.

A well or recess 110 is formed in a center of a ferrule stop 112. This well 110 serves as a "dirt catcher" since any debris collected at the end of a ferrule (not shown) will fall into well 110 instead of accumulating at the interface between the ferrule placed in a ferrule bore 114 and ferrule stop 112. A longstanding problem with optical connectors has been the accumulation of debris which can possibly contact and scratch the surface of the ferrules and thereby scratch the plastic or glass of the fiber within the ferrule as a result of reconnections. In accordance with the present invention, the debris harmlessly collects on the surface of well 110 in out-of-focus positions.

The present invention provides an optical design which minimizes the overall length of the OSAs, but still maintains a unity magnification needed for good alignment tolerances and high coupling efficiency. TOSA 100 and ROSA 102 each include a TO can 130 and 132, respectively. TO cans 130 and 132 include optoelectronic (OE) chips 134 and 136. Chip 134 represents a laser for optical transmission, and chip 136 represents a receiver for receiving optical transmissions.

In accordance with the present invention, an opening 138 for the TO cans in the housing cavity is oversized. In a preferred embodiment, opening 138 is oversized by about 320 μm. Other oversize dimensions may also be employed. The oversize is sufficient to permit active alignment of the optoelectronic chip to the fiber despite all the x, y and z offsets from an ideal position of the OE chip 134 or 136 in TO cans 130 and 132 suffered when placed with standard tools. In particular, in a preferred embodiment, the oversize of opening 138 permits the x, y, and z adjustments needed during active alignment of TO can 130 with a tilted window, used with a laser chip. A tilted window 140 is shown for TOSA 100 in FIG. 2. Opening 138 permits adequate space for a TO46 can for vertical cavity surface emitting lasers or TO56 can for edge emitting lasers and still maintains enough of a rim about housings 104 and 106 for application of an adhesive to mount TO cans 130 and 132 in place. The square (or rectangular) cross-section of the housings enables a largest possible area on a face of the housing for depositing adhesive given the severe space constraints of the SFF design. Other cross-sectional shapes are also permitted, for example a circular cross-section. High adhesion strength is possible only if a large fillet of adhesive is present about the interface between the TO cans 130 and 132 and housings 104 and 106. Such a large fillet would not be possible with round housings, since the space constraints would dictate only a thin wall of adhesive. The rectangular shape enables relatively large amounts of adhesive to be placed in the corners of the housing face. The rectangular shape also gives some added stiffness to housings 104 and 106 because of the added material at the corners. The rectangular shape makes it easier to secure the housings 104 and 106 to each other and to a retainer (receptacle) for the housings as will be described below. Housings 104 and 106 include a large radius 144 outside bore 114. Radius 144 transitions from a smaller (about 2.92 mm) to the larger (about 6.65 mm) rectangular portion of TOSA 100 and ROSA 102. This enables bore 114 to withstand off-optical-axis stresses without breakage.

Advantageously, the present invention provides for an integral aperture which is added during molding of housings 104 and 106 so that laser light beyond a numerical aperture (NA) of 0.2 (or an acceptance NA of the fiber) can be redirected through a long path in the material of the housings along bore 114 and thus be absorbed therein. This reduces the ratio of open TOSA power to coupled power which permits TOSA 100 to be run at a higher output and still maintain class 1 eye safety limits. This feature is particularly important for use with edge emitting lasers which have a higher output NA (0.3).

Figure 4A:
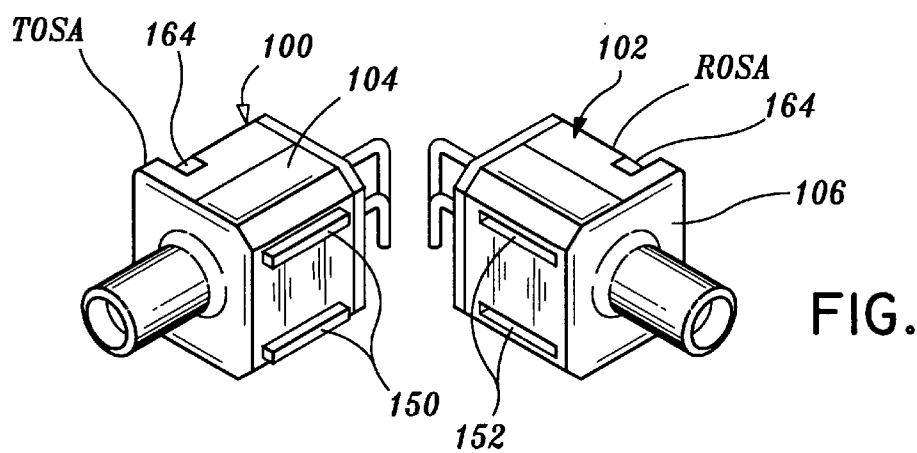
FIG. 4A is a perspective view of the optical subassemblies of FIG. 2 showing a rail and track attachment device for connecting two housings in accordance with the present invention.
Figure 4B:
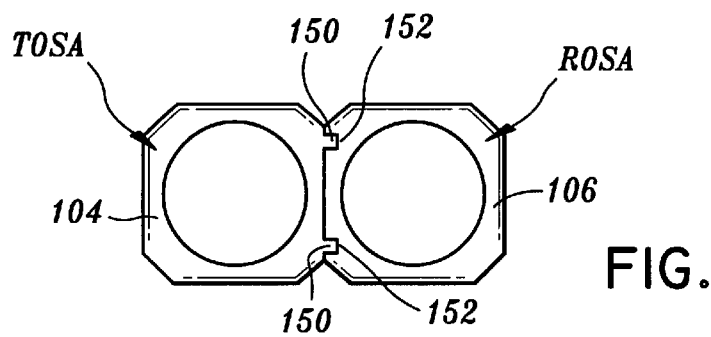
FIG. 4B is a front view of the optical subassemblies of FIG. 4A showing the rail and track attachment device connecting the two housings in accordance with the present invention.
Figure 5A:
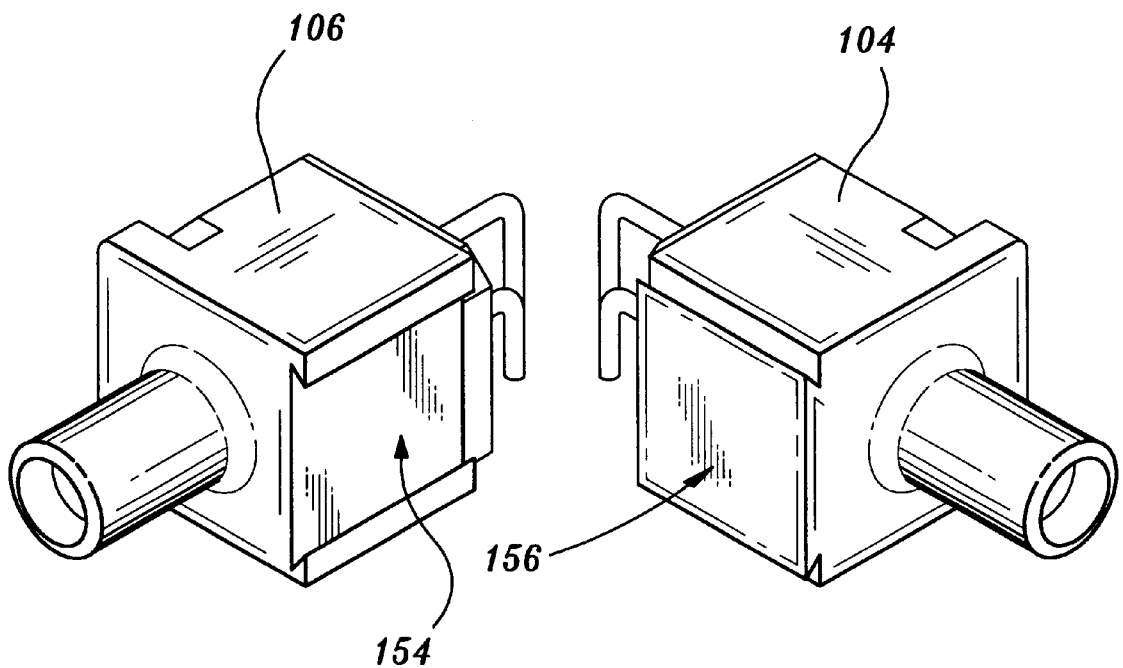
FIG. 5A is a perspective view of the optical transceiver of FIG. 2 showing a dovetail attachment device for connecting two housings in accordance with the present invention.
Figure 5B:
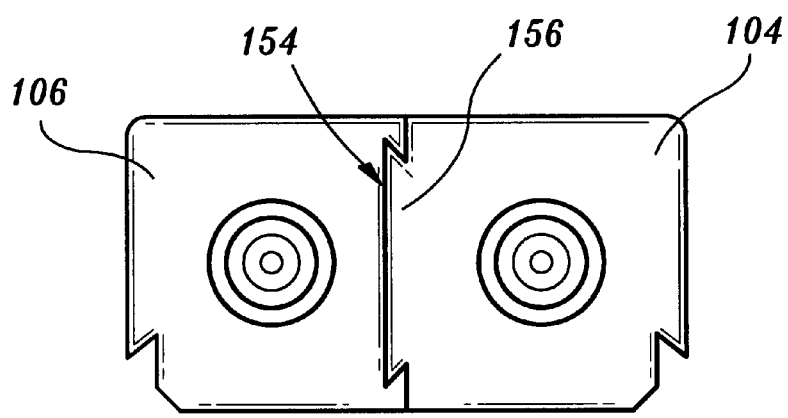
FIG. 5B is a front view of the optical transceiver of FIG. 5A showing the dovetail attachment device connecting the two housings in accordance with the present invention.

Referring to FIGS. 4A–B and 5A–B, features are provided on the TOSA and ROSA housings 104 and 106 to enable them to be mechanically linked together. These features include protrusions (ridges) 150 on one housing and recesses (slots) 152 on the other housing. When the two housings are pushed together, this rail-and-groove system locks the housings together so that together they occupy a space in compliance with a size specification (FIGS. 4A–B). Alternative concepts for housing locking include dovetails 154 and 156 (or track and rails) (FIGS. 5A–B) or pins and holes (not shown), or other latching or attaching features. By any of these means, the needed ferrule center spacing (for example, 6.25 mm) is maintained.

Figure 6A:
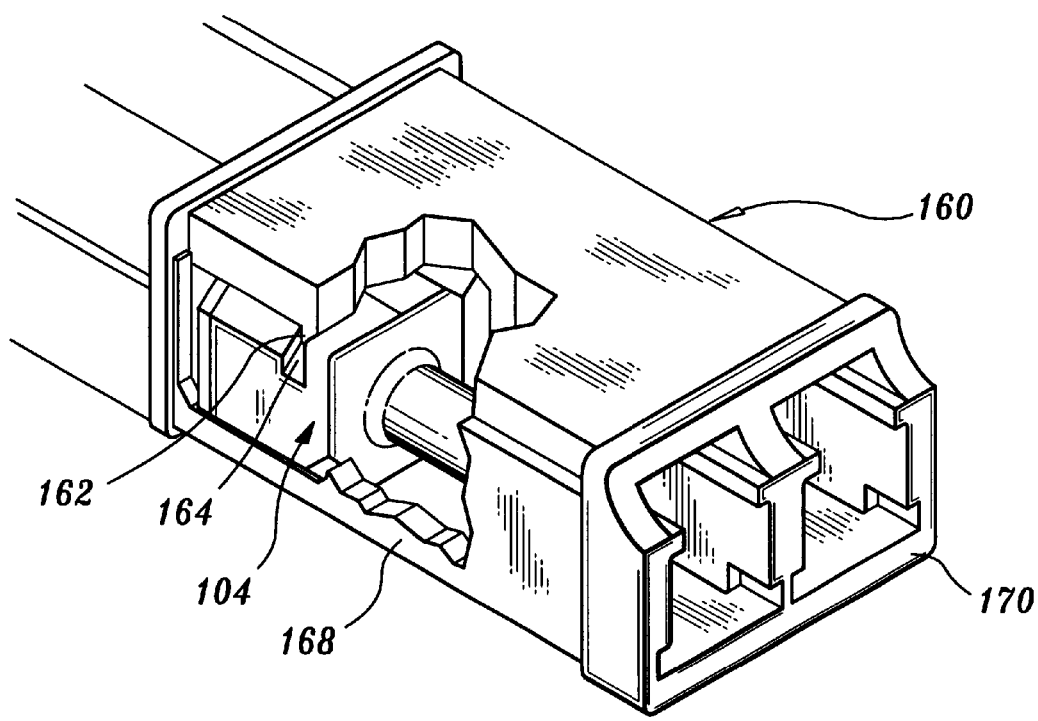
FIG. 6A is a perspective view of a retainer for securing the optical subassemblies of FIG. 2 showing a connector interface to the subassemblies in accordance with the present invention.
Figure 6B:
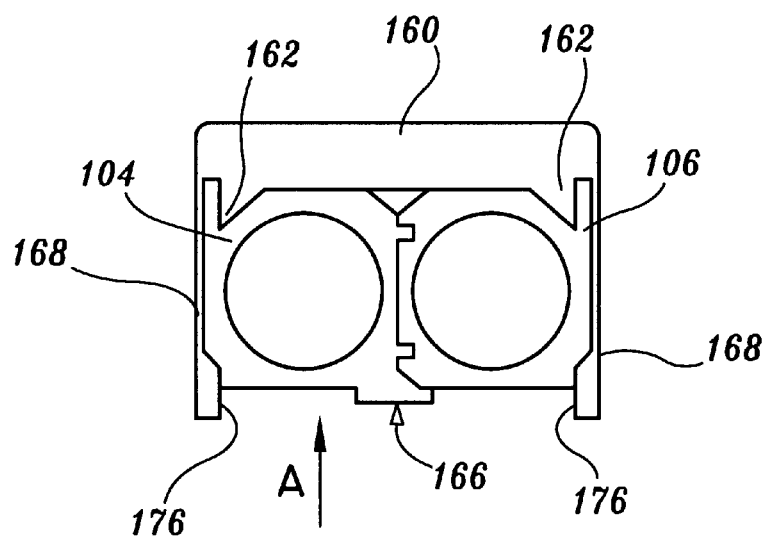
FIG. 6B is a cross-sectional view of the retainer of FIG. 6A showing a U shape configuration of the retainer in accordance with the present invention.

Referring to FIGS. 6A and 6B, features are provided at corners of housings 104 and 106 which enable them to be mechanically locked to corresponding features in a retainer 160. Retainer 160 is preferably formed from a molded-plastic material. Retainer 160 is U-shaped and open at the bottom in the region associated with the OSAs (FIG. 6B), and is provided with projections 162 which fit into slots 164 in the corners of housings 104 and 106 (see also FIGS. 3A–B and 4A–B). The locked-together ROSA-TOSA assembly 166 is pushed into retainer 160 from below (in the direction of arrow "A"), so that its sidewalls 168 are temporarily forced apart and projections 162 engage slots 164. At this point the sidewalls 168 spring back in place so that the ROSA-TOSA assembly 166 is securely captured by retainer 160. A connector interface 170 is included for receiving and securing connectors (with ferrules) into retainer 160 to operatively connect to TOSA-ROSA assembly 166.

Figure 7A:
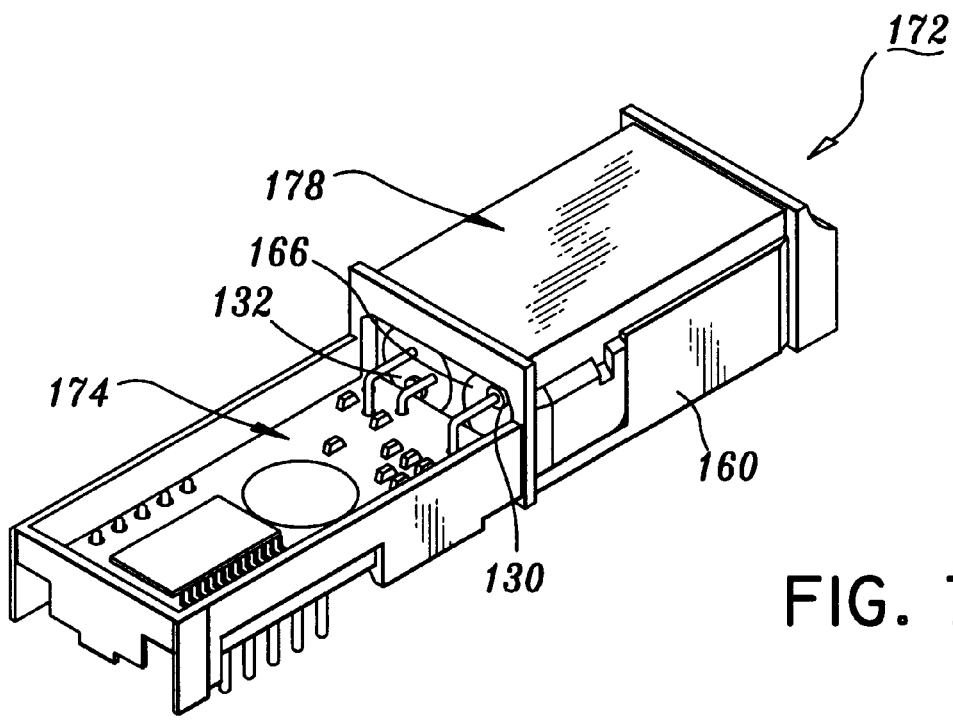
FIGS. 7A–B are a perspective views of a transceiver module in accordance with the present invention.
Figure 7B:
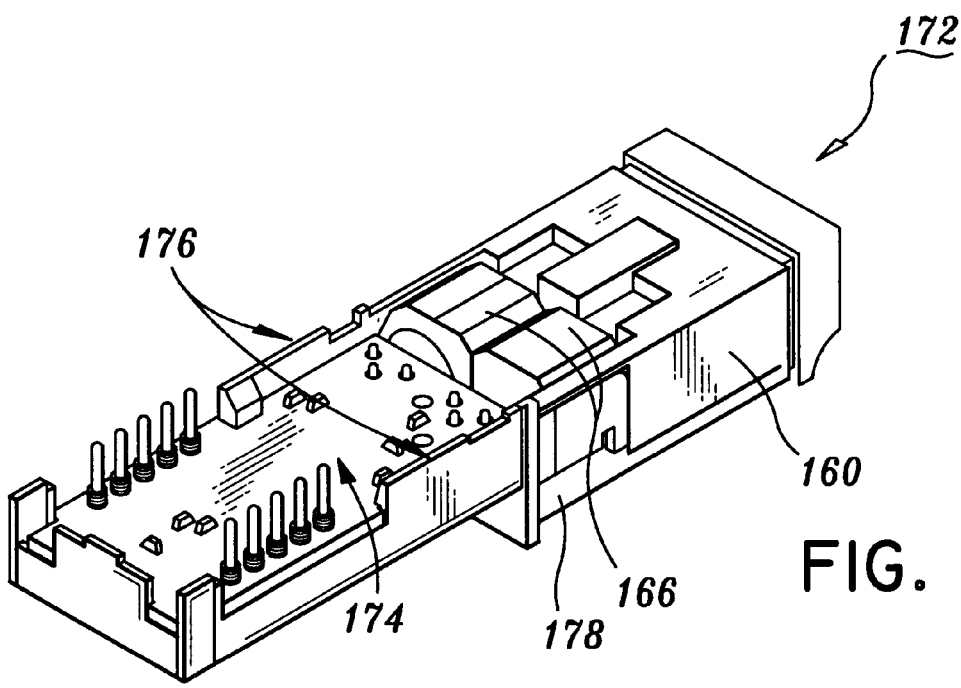

Referring to FIGS. 7A–B, a SFF LC transceiver module 172 is illustrated in accordance with the present invention. After insertion of ROSA-TOSA assembly 166, a populated circuit board 174 with ROSA-TOSA assembly 166 attached thereto is pushed into retainer 160 and is held in place by spring clips 176 (spring clips 176 are preferably molded-plastic) on the side walls of retainer 160. During this operation, the leads on TO cans 130 and 132, which were previously formed to give a 90° bend, are inserted into holes provided for them in circuit board 174, and subsequently soldered to make electrical contact to the conductors on the board. A metal shell 178 which serves both as a strength member and electrical shield is slipped over module 172 and held in place by spring action. The completely assembled ROSA-TOSA module 172 is shown in FIGS. 7A–B.

Alignment procedures and fixing processes will now be described for the present invention. As described above, two-axis alignment, i.e., X, Y alignment, is adequate for alignment of the Duplex SC product because the components, and in particular the TO56 can, were fabricated with sufficient precision to allow Z alignment to be omitted. Since the parts of the present invention advantageously include wider tolerances a three-axis alignment may be desirable. This alignment may be carried out under full computer control, including the following steps:

1. The housing/TO-can contact is determined. After contact is sensed, the housing is raised to a preset value of the housing/TO-can gap ($\Delta Z$ value).
2. At the Z position determined in step 1, that X, Y position giving maximum coupling efficiency (CE) is found by an X, Y scan algorithm.
3. The housing is moved toward the TO can so that a small housing-VCSEL gap ($\Delta Z$) value is attained (approximately 100 $\mu$m).
4. Starting from the Z position determined in step 3, a scan algorithm for increasing Z (increasing housing/TO-can gap) is used to find that Z position giving maximum CE.
5. The optimum X, Y position is determined for the Z position found in step 4.
6. Another Z scan is taken to find the optimum Z position, this time under an algorithm specially tailored to take account of the flat-topped nature of the Z-scan profile.
7. The optimum X, Y position is determined for the Z position found in step 6. UV epoxy is applied to hold the TO can.
8. The UV is turned on and air cooling is applied.
9. The finished TOSA/ROSA is removed from the tool.

It should be noted that variations in the 3-axis alignment procedure may also be employed.

Two adhesive applications are preferably used to ensure a high strength bond between housings and TO cans, where the first adhesive may be considered a "tacking" adhesive used only to hold the housing to the TO can temporarily until the second, stronger adhesive could be applied and cured. However, instead of using a thermally cured epoxy for the first adhesive, a UV curable adhesive is preferably used because consequent absence of thermal expansion makes the maintenance of good alignment upon curing easier and because of its relatively short cure time. The adhesive could be applied either to the TO can or to the housing. Several different UV-curable adhesives from various manufacturers may be used, preferably Dymax 6–628 GEL is employed which is available from Dymax Corp., Torrington Conn.

Zeospheres W-210 may be added to increase the viscosity. Zeospheres are available from Zeelan Industries, 3M, Minneapolis, Minn. UV-curable adhesives provide good adhesion for short cure times, while the viscosity permits easy application when dispensed from a syringe in a uniform, circular bead. A large fillet of adhesive is applied (as described above) to ensure good adhesion. Cure times in the range of 10 to 30 s were adequate when care was taken to apply intense UV light evenly around the periphery of the fillet.

Following application and cure of the UV-curable first adhesive and removal of the finished OSA from the alignment-fixing tool, the second adhesive was applied. After the second adhesive was applied to a large number of OSAs, they could be cured in a large batch. The second adhesive may include either an epoxy, e.g., Epotek 353 NDT, available from Epoxy Technology Inc., Billerica Mass., in which case an oven cure is used, or alternatively another UV-curable adhesive, e.g., Emcase 712-160K, available from Electronic Materials Inc., Breckenridge Colo., in which case a UV chamber may be used for curing. Excellent housing to TO-can was found for both alternatives. Alternatively, the heat-curable epoxy could be applied inside the housing first (to form a bond between the TO can and the inner wall of the housing) while the UV adhesive was applied afterward to the outside surface of the housing. Alignment can be carried out by fixing the TO can by curing the UV adhesive with a final heat cure of the OSAs in a batch mode to cure the heat-curable epoxy. This latter implementation provides more strength to the OSA overall but is limited to use with heat curable epoxy as the second adhesive.

For housings made of polyetherimide, it may be necessary to ensure UV exposure on the adhesive directly, since the housing material is opaque to UV. However, for housings made of alternative materials such as polycarbonate which are more transparent to UV, the UV source can be arranged so that some radiation passes through the housing on its way to the adhesive, thereby making it easier to cure the adhesive.

Figure 8A:
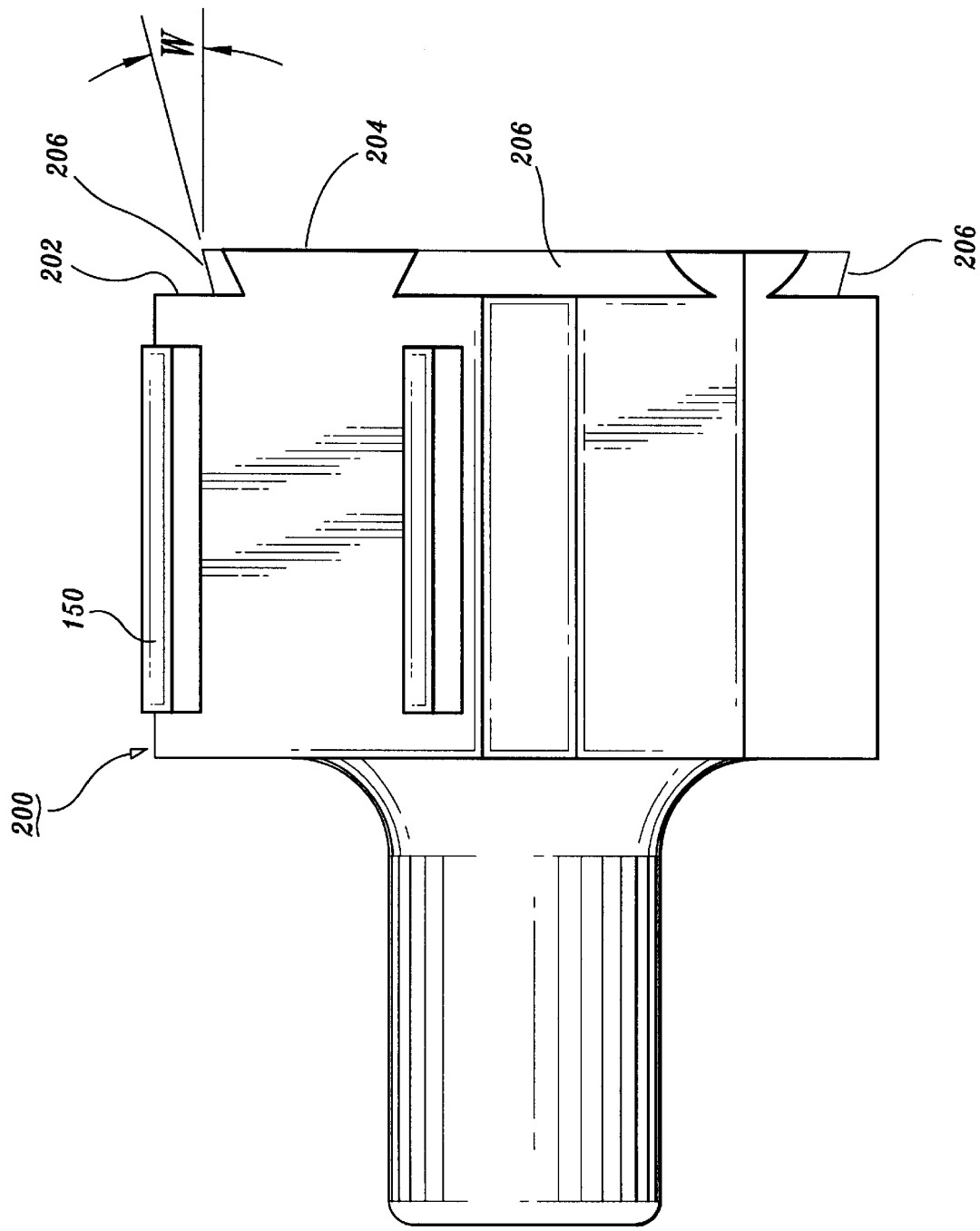
FIGS. 8A and 8B depict a side view and a perspective view, respectively, of an optical subassembly housing employing a protrusion for improving TO can bonding to the housing in accordance with the present invention.
Figure 8B:
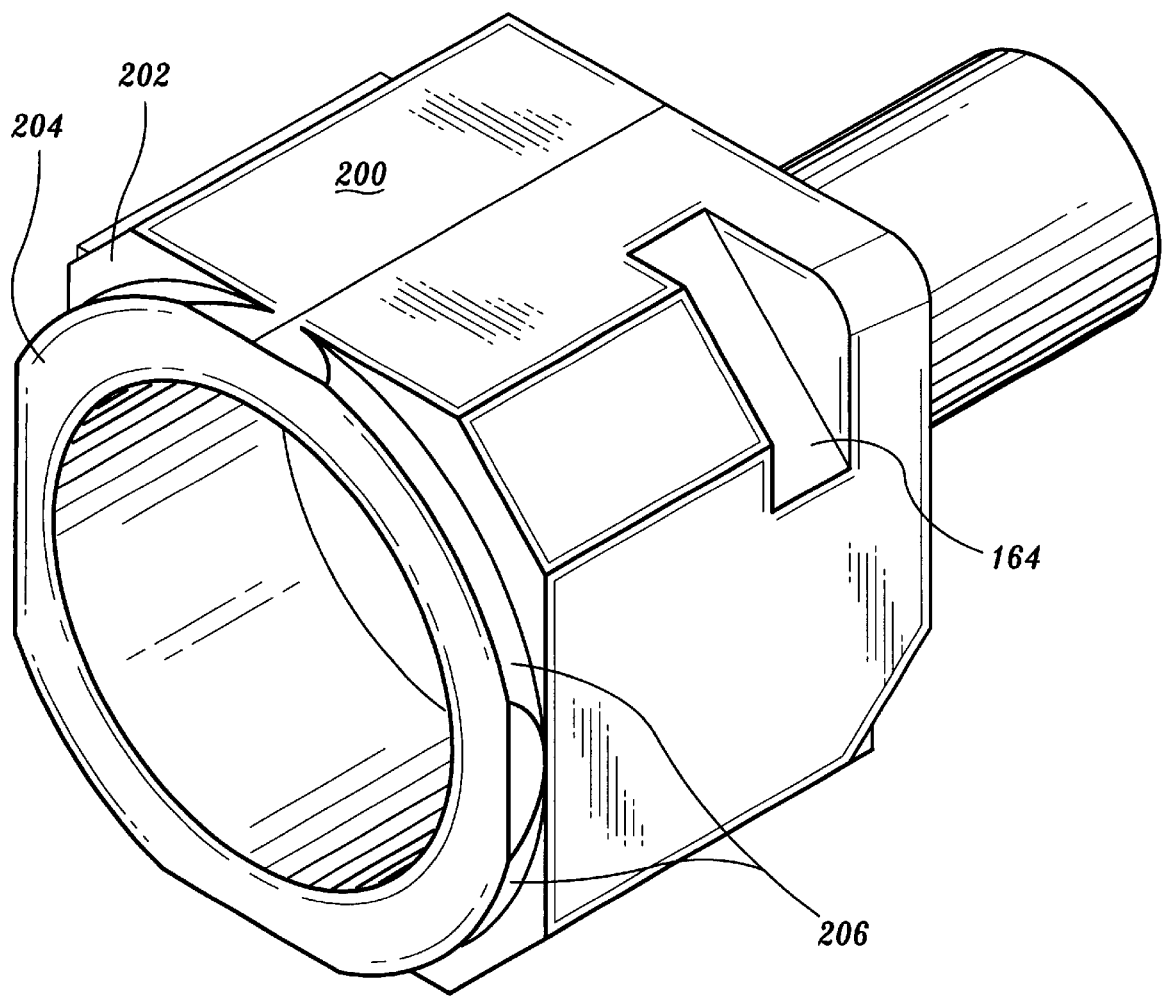

Referring to FIGS. 8A and 8B, an alternate embodiment of an OSA housing 200 is shown. A back face 202 of OSA housing 200 includes a protrusion 204 for receiving a TO can therein. An exterior surface 206 of protrusion 204 includes an angled portion 208. Angled portion 208 may form an angle W of about 15 degrees, although other angles are contemplated. When TO cans are received in housing 200, epoxy is spread around angled portions 208 and over protrusion 206 and portion of the TO can. Angled portions 208 provide a place for UV adhesive to flow when bonding a TO can to housing 200. For flat faces, a bond of the UV adhesive to a housing is primarily dictated by the peel strength of the adhesive. Experimental testing of the pull strength of the bonding of the TO-CAN to the body revealed the that the bond is more likely to break at the epoxy to housing interface.

To improve the adhesion of the UV epoxy adhesive to the OSA housing, angled portions 208 provide a place for UV adhesive to flow which when cured will give the UV bond a component of shear strength to capture or lock the glue to housing 200, and provide greater surface area in the bond. Because of the small size of these parts, this provides a significant amount of strength which is added in accordance with this embodiment. Other protrusion and angled portions may be employed which provide increased bonding area and a shear component to the bond between a TO can and an OSA housing. In one embodiment, surface 206 is textured, roughed or includes structures to improve the bonding of adhesive thereto.

The present invention provides a reduced size optical subassembly which provides a unibody design with a plano-convex lens integrally formed therein. The present invention includes a dirt catcher recess formed within a ferrule stop which is also integrally formed in the unibody housing. Other important features include a rectangular housing, NA control, wider openings for standard tool access, UV-curable compounds and many other features.

Having described preferred embodiments for small form factor optical subassemblies (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. An optical subassembly comprising:
   a housing including a first end portion and a second end portion oppositely disposed from the first end portion;
   the first end portion forming a bore configured and dimensioned to receive a connector ferrule having an optical fiber therein, the bore being adjacent to a ferrule stop integrally formed in the housing;
   a lens integrally formed with the housing, the lens having a planar surface and a convex surface opposite the planar surface, the planar surface of the lens being substantially parallel to and set in from the ferrule stop to prevent contact between the ferrule and the planar surface;
   an optical device in operative relationship with the bore, the lens being optically aligned with the fiber in the ferrule; and
   wherein the housing includes a protrusion extending from the second end portion forming a substantially circular opening in the housing for receiving the optical device, the protrusion including an angled external surface about the circular opening to receive a bonding compound for bonding the optical device to the housing.

2. The optical subassembly as recited in claim 1, wherein the optical subassembly includes an optical transmitter.

3. The optical subassembly as recited in claim 2, wherein the optical subassembly is class 1 eye safe.

4. The optical subassembly as recited in claim 2, wherein the housing includes a material transparent to wavelengths of light provided by the optical transmitter.

5. The optical subassembly as recited in claim 2, wherein the optical transmitter is a laser transmitter and the laser of the transmitter is one of a vertical cavity surface emitting laser and an edge emitting laser.

6. The optical subassembly as recited in claim 1, wherein the housing is substantially rectangular and forms a substantially circular opening in the housing for receiving the optical device.

7. The optical subassembly as recited in claim 6, wherein the optical device is bonded to the housing with an ultraviolet light curing compound.

8. The optical subassembly as recited in claim 1, wherein the housing includes one of polycarbonate, polyethersulfone and polyesterimide.

9. The optical subassembly as recited in claim 1, wherein the optical subassembly includes an optical receiver.

10. The optical subassembly as recited in claim 1, wherein the optical device is housed in a TO can package.

11. The optical subassembly as recited in claim 1, wherein the optical subassembly is adapted for connectors using ferrules of about 1.25 mm diameter.

12. The optical subassembly as recited in claim 1, wherein the ferrule stop includes a recess for receiving debris introduced into the bore.

13. The optical subassembly as recited in claim 1, wherein the convex surface is separated from the planar surface to permit light, from the optical fiber, beyond an acceptance numerical aperture for the lens to be redirected back into the first end portion.

14. A transceiver module comprising:
    a compliant retainer having a first end portion oppositely disposed to a second end portion, the first end portion dimensioned and configured to receive optical connectors;
    a circuit board being received in the second end portion of the retainer, the circuit board connecting to optical subassemblies for coupling to the optical connectors, the circuit board for processing signals to and from the transceiver module and the optical subassemblies, the second end portion including a U shaped portion for permitting the optical subassemblies to be received in the retainer;
    the transceiver including a transmitter optical subassembly matable to a receiver optical subassembly, each of the transmitter optical subassembly and the receiver optical subassembly including:
        a substantially rectangular housing forming a bore configured and dimensioned to receive a ferrule having an optical fiber therein, the bore being adjacent to a ferrule stop integrally formed in the housing; and
        a lens integrally formed with the housing, the lens having a planar surface and a convex surface opposite the planar surface, the planar surface of the lens being substantially parallel to and set in from the ferrule stop to prevent contact between the ferrule and the planar surface.

15. The transceiver module as recited in claim 14, wherein the ferrule stop includes a recess for receiving debris introduced into the bore.

16. The transceiver module as recited in claim 14, further comprising an optical device for each of the transmitter optical subassembly and the receiver optical subassembly in operative relationship with the bore, and the lens being optically aligned with the fiber in the ferrule.

17. The transceiver module as recited in claim 14, wherein the transmitter optical subassembly and receiver optical subassembly are matable by an attachment means integrally formed in the housing of the transmitter optical subassembly and the receiver optical subassembly.

18. The transceiver module as recited in claim 14, wherein the transmitter optical subassembly is class 1 eye safe.

19. The transceiver module as recited in claim 14, wherein the housings of the transmitter optical subassembly and the receiver optical subassembly include a material transparent to wavelengths of light provided by the transmitter optical subassembly.

20. The transceiver module as recited in claim 14, wherein the transmitter optical subassembly includes a laser and the laser of the transmitter optical subassembly is one of a vertical cavity surface emitting laser and an edge emitting laser.

21. The transceiver module as recited in claim 14, wherein the housings of the transmitter optical subassembly and the receiver optical subassembly include one of polycarbonate, polyethersulfone and polyetherimide.

22. The transceiver module as recited in claim 14, wherein the bores are adapted for ferrules of about 1.25 mm diameter.

23. The transceiver module as recited in claim 14, wherein the housings of the transmitter and receiver optical subassemblies form a substantially circular opening for receiving an optical device.

24. The transceiver module as recited in claim 23, wherein the optical device includes a TO can.

25. The optical subassembly as recited in claim 23, wherein the housing includes a protrusion extending from a second end portion opposite the bore, the protrusion forming a substantially circular opening in the housing for receiving the optical device, the protrusion including an angled external surface about the circular opening to receive a bonding compound for bonding the optical device to the housing.

26. A transceiver comprising a transmitter optical subassembly housing matable to a receiver optical subassembly housing, each of the transmitter optical subassembly and the receiver optical subassembly including an attachment structure for receiving and securing the attachment structure of the other, the attachment structures being integrally formed into the housings; and
    a compliant retainer having a first end portion dimensioned and configured to receive optical connectors and a second end portion including a U shaped portion for permitting the transmitter optical subassembly and the receiver optical subassembly to be received in the retainer.

27. The transceiver as recited in claim 26, wherein the attachment structure on one subassembly includes tabs and the attachment structure on the other subassembly includes holes for receiving the tabs.

28. The transceiver as recited in claim 26, wherein the attachment structures include slidably matable dovetail-shaped structures.

29. An optical subassembly comprising:
    a housing including a first end portion and a second end portion oppositely disposed from the first end portion;
    the first end portion forming a bore configured and dimensioned to receive a connector ferrule having an optical fiber therein, the bore being adjacent to a ferrule stop integrally formed in the housing;
    a lens integrally formed with the housing, the lens having a planar surface and a convex surface opposite the planar surface, the planar surface of the lens being substantially parallel to and set in from the ferrule stop to prevent contact between the ferrule and the planar surface; and
    an optical device in operative relationship with the bore, the lens being optically aligned with the fiber in the ferrule;
    wherein the convex surface is separated from the planar surface to permit light, from the optical fiber, beyond an acceptance numerical aperture for the lens to be redirected back into the first end portion.

* * * * *